WALTER A. ANCLIFF
Inventor

Feb. 22, 1966 W. A. ANCLIFF 3,236,555
WINDOW FASTENER ASSEMBLY
Filed Jan. 22, 1964 3 Sheets-Sheet 3

WALTER A. ANCLIFF
Inventor

By John R. Faulkner
John J. Roethel
Attorneys

United States Patent Office 3,236,555
Patented Feb. 22, 1966

3,236,555
WINDOW FASTENER ASSEMBLY
Walter A. Ancliff, Upminster, Essex, England, assignor to Ford Motor Company, Dearborn, Mich., a corporation of Delaware
Filed Jan. 22, 1964, Ser. No. 339,542
5 Claims. (Cl. 296—44)

The invention relates to vehicle window assemblies and is particularly concerned with vehicle window assemblies which comprise a window hinged on the vehicle body; a weather sealing strip between the body and the window; and a window fastening or latch mechanism which comprises an attachment member secured to the vehicle body, a first link pivotally connected to the attachment member and a second link pivotally connected to the first link and to the window. The window is rockable from an open to a closed position, at which the sealing strip is compressed between the window and the body, by toggle action of the two links.

With such window assemblies the degree to which the sealing strip is compressed varies from vehicle to vehicle owing to manufacturing tolerances.

According to one aspect of the invention, the window fastening or latch mechanism is adjustable so as to control the degree to which the sealing strip is compressed when the window is closed and is also adjustable such that the distance to which the window fastening or latch mechanism projects away from the vehicle can be varied. According to another aspect of the invention, the attachment member is tiltably mounted on the vehicle body and is adapted to be secured to the body in a desired tilted position relatively to the body; and the degree to which the sealing strip is compressed, when the window is closed, is controllable by adjustment of the tilt angle of the attachment member.

Preferably the attachment member is rockable on a base member which has a surface in contact with a complementary surface of the vehicle body. The complementary surfaces are preferably flat.

Conveniently, the attachment member and the base member have edges on one member in contact with surfaces on the other member; and the attachment member is rockable on the base member with relative sliding movement between the edges and surfaces in contact. Preferably the base member is free to slide on the complementary surface of the vehicle body relatively to the attachment member.

The invention will next be particularly described with reference to the accompanying drawings in which.

Figure 1:
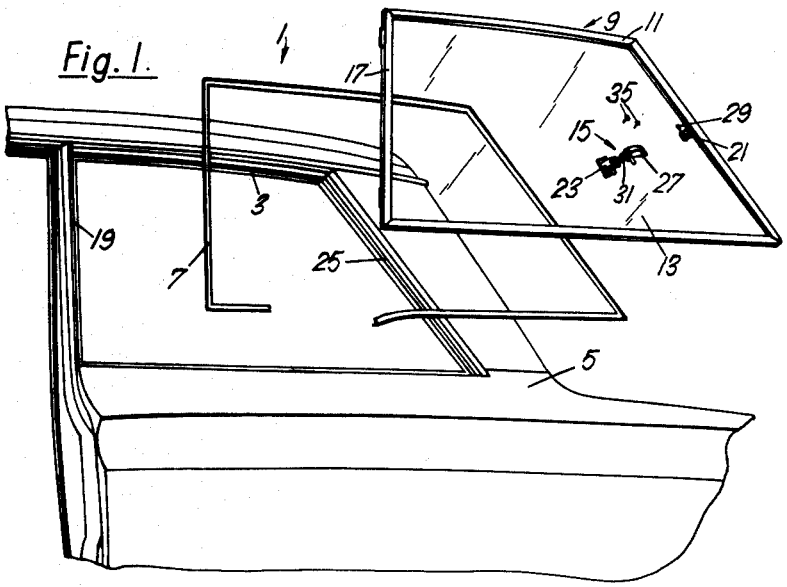
FIG. 1 is an exploded view of parts of a known motor vehicle rear quarter ventilator window arrangement.

The known rear quarter window arrangement 1 (FIG. 1) comprises a window opening frame 3 mounted in the vehicle body 5; a weather sealing strip 7 which, in assembly, is attached by adhesive around the window opening frame 3; a ventilator window 9, which has a window frame 11 and a window pane 13; and a window fastening or latch mechanism 15. The window frame 11 is hinged, at its forward edge 17, to the forward edge 19 of the window opening frame 3. With the window 9 closed the sealing strip 7 is compressed between the window frame 11 and the window opening frame 3.

Figure 2:
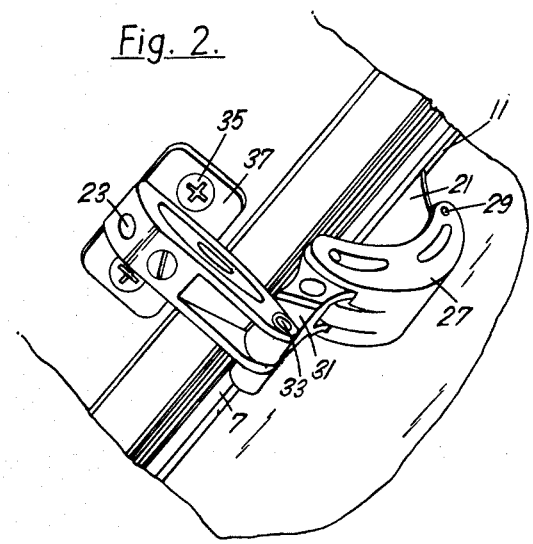
FIG. 2 is a perspective view of a conventional or known window fastening or latch mechanism.

The known window fastening or latch mechanism 15 (FIG. 2) comprises a bracket 21 secured to the window frame 11; an attachment member 23 secured to a panel of the vehicle body 5 close to the rear edge 25 of the window opening frame 3; and a pair of toggle links, one link, the bracket link 27, being pivoted on the bracket 21 by a pin 29 and the other link, the attachment member link 31, being pivoted on the attachment member by a pin 33.

The attachment member 23 is secured to the body panel in a predetermined attachment position by screws 35 which extend through lateral flanges 37 of the attachment member 23.

In the improved window fastening or latch mechanism (FIG. 3) the attachment member 39 has surfaces 41, 43 intersecting at a straight edge 45 and is secured to the body, with the edge 45 in direct contact with the body panel 47, by screws 49 which extend through holes 51 in the attachment member 39 and slots 53 in the body panel and which are screwed into a tapping plate 55 located within a shallow channel section retaining plate 57 secured to the body of the vehicle and having slots 59 through which the free ends of the screws 49 project.

In distinction from the known fastening (FIG. 2) the attachment plate 39 is angularly adjustable about the edge 45 and is movable longitudinally within the range of movement permitted the screws 49 by the slots 53 of the body panel.

Angular adjustment of the attachment plate 23 relatively to the body is accomplished by loosening one of the screws 49 and tightening down on the other screw 49. This action causes the attachment member to pivot in one sense or the other about the edge 45. With the tilt angle of the attachment member adjusted, the attachment member 39 is rigidly secured on the body by a final tightening of the screws 49 the resulting tension in the screws 49 ensuring that the tapping plate 55 is held firmly against the body panel.

With the known window arrangement (FIGS. 1 and 2) since no adjustment can be made to the tilt angle of the attachment member 23, differences in the position of the pivot axis 33 due to variations in the body shape of vehicles at the position of attachment of the attachment member 23, give use to differing degrees of sealing strip compression from vehicle to vehicle.

By contrast, with the improved window arrangement (FIG. 3) the ability to adjust the tilt angle of the attachment member 39 enables a satisfactory weather seal to be obtained irrespective of variations in the body shape at the attachment position of the attachment member.

The distance through which the window fastening projects into the vehicle interior is adjustable by movement of the attachment member 39 in the direction of the body panel slots 53. After loosening the screws 49 the attachment member 39 and the tapping plate 55 may be moved to any desired position within the range of movement of the screws 49, and then secured to the body panel by tightening the screws 49.

By adjustment of the position of the attachment member both as regards tilt angle and as regards the position of the screws 49 in the body panel 53, it is possible to obtain a satisfactory degree of sealing strip compression and at the same time to maintain the distance A of projection of the window fastening, into the vehicle body interior, down to a minimum.

In a modification (FIGS. 4 to 9) the attachment member 39 is not in direct contact with the body panel but, instead, engages a base member 61 which has a flat surface 63 in contact with a flat surface of the body panel 65. The base member 61 has inclined surfaces 67 and the attachment member 39 has recess 69 within which the base member 61 projects, and edges 71 in contact with the inclined surfaces 63 of the base member 61. Flanges 83, on the base member 61, close the recess 69 in the attachment member.

The attachment member 39 has holes 73 in register with slots 75 in the base member 61 and slots 77 in the body panel 65. Screws 79 extend through the holes 73 in the attachment member and the slots 75, 77 in the base member 61 and body panel 65, respectively, and are screwed into a tapping plate 81 located within a shallow channel-section retaining plate, not shown, but similar to that illustrated in FIG. 3.

By adjusting the screws 77, in the manner previously described in connection with FIG. 3, the pressure exerted by the edges 71, of the attachment member 41, on the bevel surfaces 67, of the base member 61, causes the base member 61 to slide on the surface of the body panel 65 in one direction or the other within the recess 69. The attachment member 39 tilts relatively to the body panel as a result of the change in position of contact between the edges 71 and inclined surfaces 67 consequent upon the sliding of the base member on the body panel.

Figure 3:
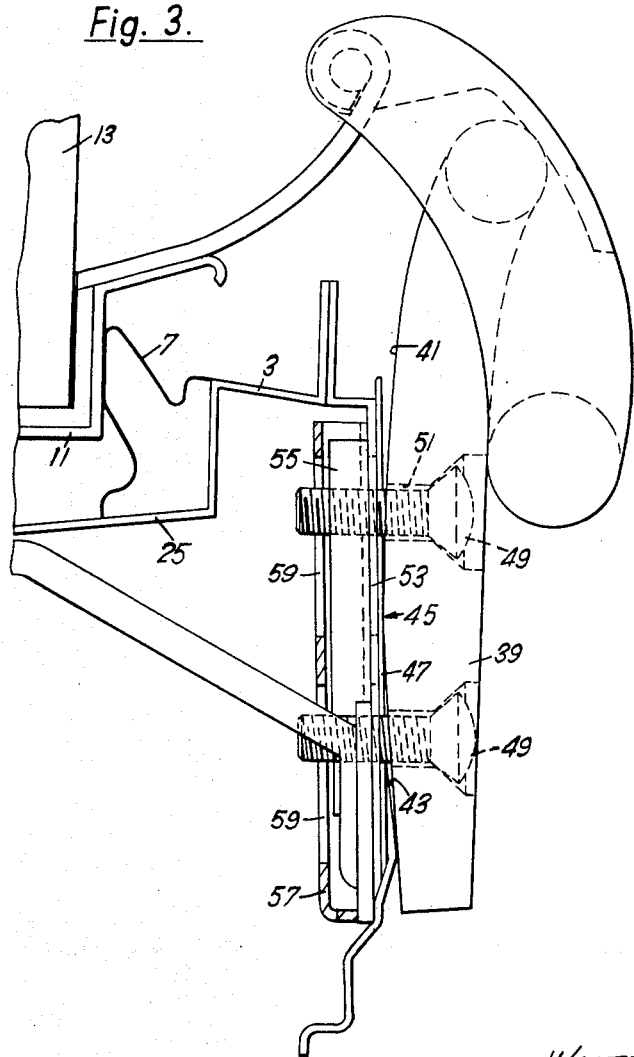
FIG. 3 is a diagrammatic elevation of a window fastening or latch mechanism embodying the present invention.
Figure 4:
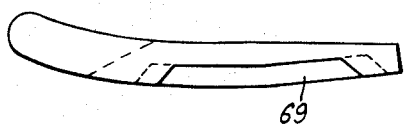
FIG. 4 is an elevation of part of another or alternative embodiment of the window fastening or latch mechanism of the present invention.
Figure 6:
FIG. 6 is an elevation of another part of the alternative window fastening or latch member.
Figure 5:
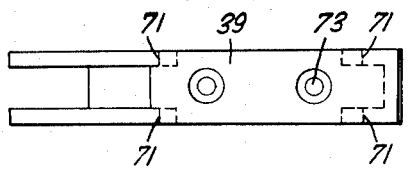
FIG. 5 is a plan view of the part illustrated in FIG. 4.
Figure 7:
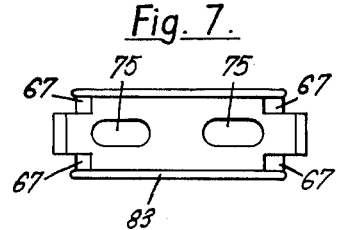
FIG. 7 is a plan view of the part illustrated in FIG. 6.
Figure 8:
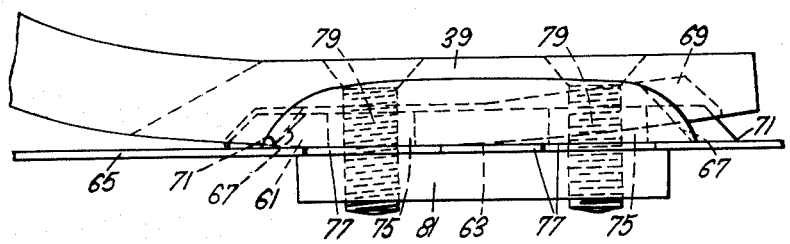
FIG. 8 is an elevation of the parts illustrated in FIGS. 4 and 6, when assembled.
Figure 9:
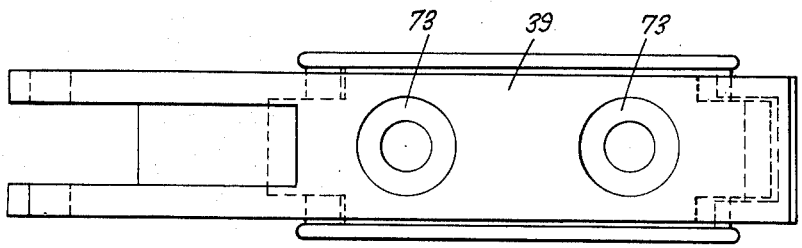
FIG. 9 is a plan view of the assembled parts.

As with the window assembly illustrated in FIG. 3, the attachment member 39 is movable in the direction of the slots 75 and 77, over the range of movement of the screws 79, so as to adjust the distance through which the window fastening projects into the vehicle interior.

It will be understood that the invention is not to be limited to the exact construction shown and described, but that various changes and modifications may be made without departing from the spirit and scope of the invention, as defined in the appended claims.

What is claimed is:

1. A vehicle window assembly which comprises a window hinged in a vehicle body;
   a weather sealing strip between the body and the window;
   and a window fastening comprising an attachment means,
   a first link pivotally connected to the attachment means,
   and a second link coupled to said first link and pivotally connected to the window;
   said attachment means comprising a base member positioned against a surface of said vehicle body and an attachment member to which said first link is pivotally connected,
   said base member having fulcrum forming means and said attachment member having fulcrum coacting portions engaged with portions of said fulcrum forming means,
   and means securing said attachment member on said base member fulcrum forming means at a selected tilt angle relative to the surface of said body;
   said window being swingable from an opened to a closed position at which the sealing strip is compressed between the window and the body by toggle action of said first and second links,
   and in which the degree of compression of the sealing strip, when the window is closed, is controllable by election of the tilt angle of the attachment member.

2. An assembly according to claim 1 in which the attachment member and the base member fulcrum forming and coacting portions comprise edges of one member in contact with surfaces of the other member;
   and in which the attachment member is rockable on the base member with relative sliding movement between the edges and the surfaces in contact.

3. An assembly according to claim 2 in which the base member is free to slide on the surface of the body relatively to the attachment member.

4. An assembly according to claim 3 in which the base member has slots,
   and in which pins respectively extending through the slots constrain the base member to slide in the direction of the slots.

5. An assembly according to claim 4 in which the slots in the base member are respectively in registration with and extend in the same direction as slots in the vehicle body and are respectively in registration with holes in the attachment members;
   and in which the pins are screws which respectively extend through their holes and slots in registration and engage a tapping plate.

References Cited by the Examiner

UNITED STATES PATENTS

| 365,152 | 6/1887 | Simson. | |
| 2,940,115 | 6/1960 | Hansen | 16—1351 |

FOREIGN PATENTS

| 13,351 | 6/1908 | Great Britain. |
| 920,434 | 3/1963 | Great Britain. |

BENJAMIN HERSH, *Primary Examiner.*